UNITED STATES PATENT OFFICE.

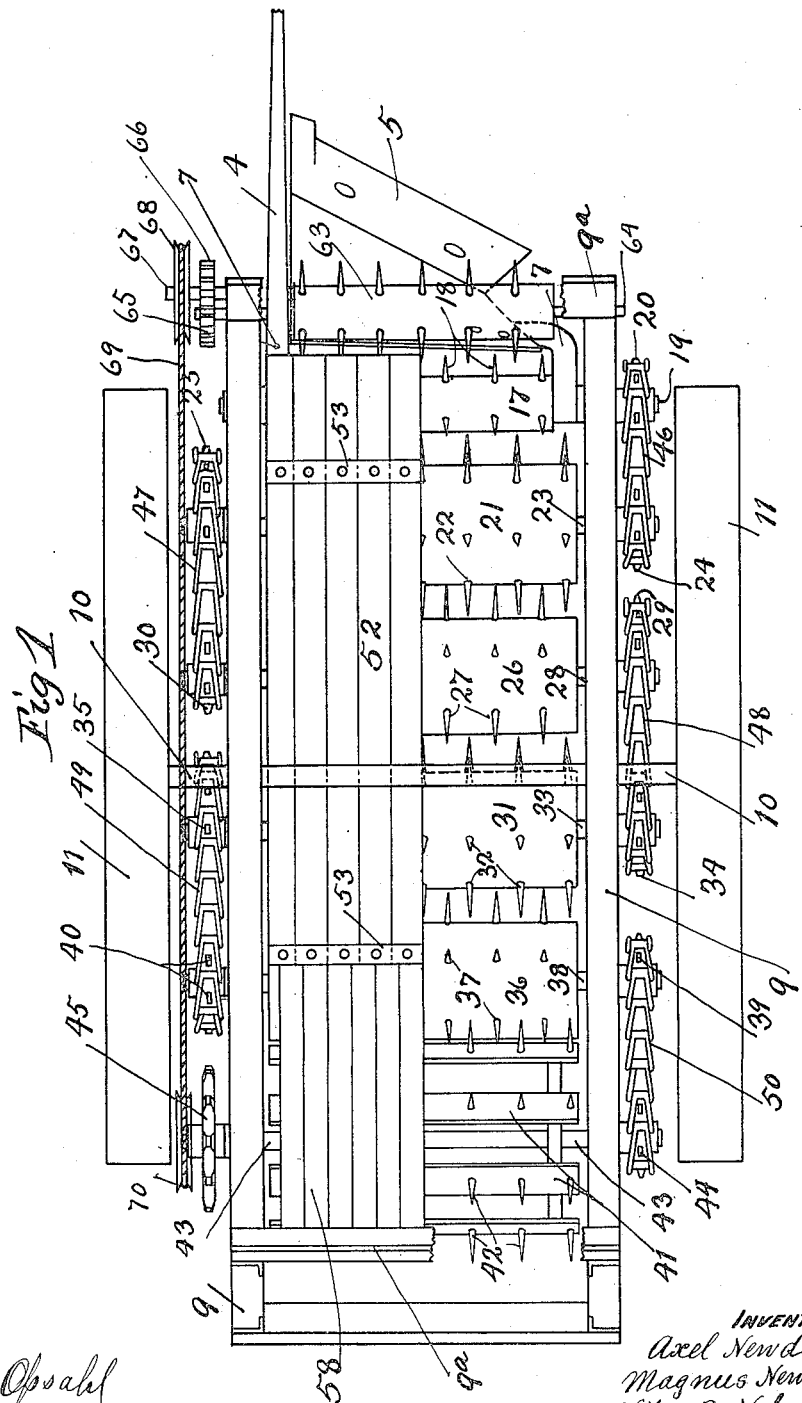

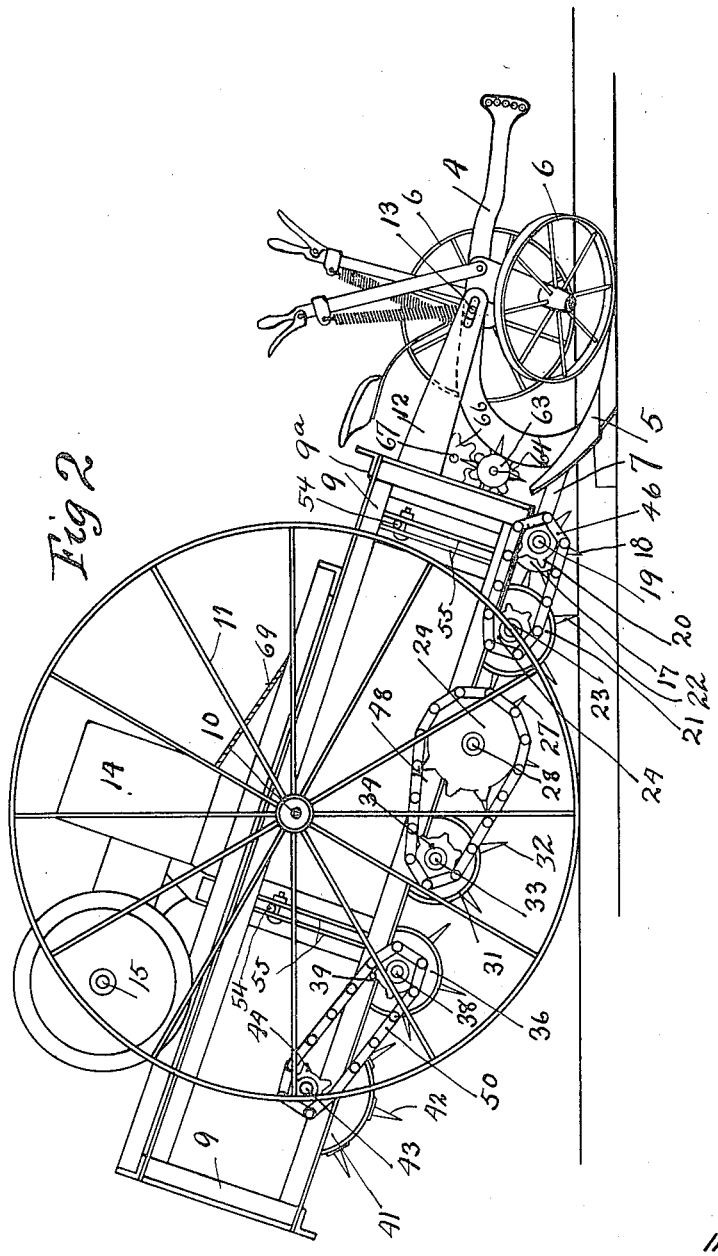

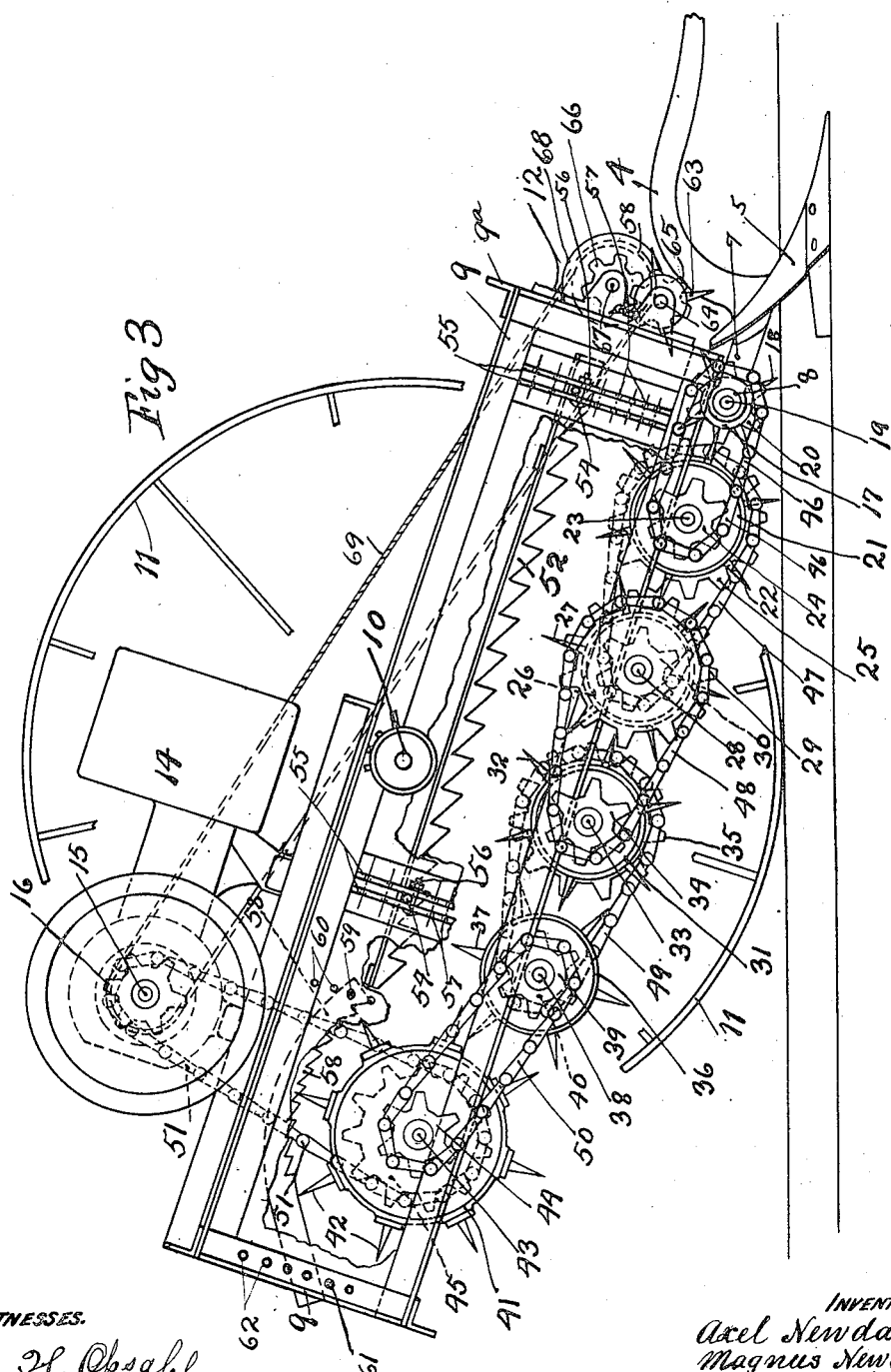

AXEL NEWDALL, OF MINNEAPOLIS, AND NELS P. NELSON AND MAGNUS NEWDALL, OF SPRINGFIELD, MINNESOTA.

SOD-DISINTEGRATOR AND QUACK-GRASS ERADICATOR.

1,341,861.  Specification of Letters Patent.  Patented June 1, 1920.

Application filed October 5, 1918. Serial No. 256,959.

*To all whom it may concern:*

Be it known that I, AXEL NEWDALL, a citizen of the United States, residing at Minneapolis, county of Hennepin, and we, NELS P. NELSON and MAGNUS NEWDALL, citizens of the United States, residing at Springfield, county of Brown, all in the State of Minnesota, have invented certain new and useful Improvements in Sod-Disintegrators and Quack-Grass Eradicators; and we do hereby declare the following to be a full, clear, and exact description of the invention, such as will enable others skilled in the art to which it appertains to make and use the same.

Our invention has for its object to provide a highly efficient sod disintegrator and quack grass eradicator, and to such ends, generally stated, the invention consists of the novel devices and combinations of devices hereinafter described and defined in the claims.

The great difficulty of digging up and destroying quack grass is well known, and it is also a well known fact that quack grass has nearly destroyed a large amount of otherwise good farm land. Hitherto, it has been possible to destroy quack grass only by laborious work involving much manual labor. Our invention provides a machine which will not only rapidly and efficiently dig up quack grass, separate the same from the dirt but also deposit the same either into a suitable receptacle, or back onto the top of the ground where it may be sun killed or raked up and otherwise destroyed.

The improved machine is illustrated in the accompanying drawings wherein like characters indicate like parts throughout the several views.

Referring to the drawings,

Figure 1 is a plan view of the improved machine, some parts being broken away;

Fig. 2 is a right side elevation of the machine; and

Fig. 3 is a view partly in right side elevation but with many of the parts broken away so as to show the internal machine.

The numeral 4 indicates the beam and the numeral 5 the mold board of a suitable plow. This plow beam and mold board will preferably be the parts of a sulky plow, but the mold board 5 should be much wider than in an ordinary plow, and arranged to throw the furrow into a horizontal position as it is raised, so that it will be properly delivered onto disintegrating rollers hereinafter noted. The sulky plow may be of any suitable type, and for the purpose of this case, it is only desirable to further note the sulky plow wheels 6. The plow beam 4, or some other suitable part of the plow, will be provided with rearwardly projecting rigid arms 7. The arms 7 are provided at their ends with sleeves in which sleevelike lateral projections 8 of a main frame 9 are pivotally mounted. The said frame 9 is a rectangular box-like structure open at front and rear ends and preferably open at the top, except for certain cross bars $9^a$. The frame 9 is intermediately hung and pivotally mounted on an axle 10, on the ends of which are journaled large truck wheels 11. The upper front portion of the frame 9 is shown as provided with a forwardly projecting pivoted arm 12 having a slotted front end connected by a pin 13 to the intermediate portion of the plow beam 4 or other suitable part of the sulky plow. The arms 12 with the slot and pin connection 13, permit upward and downward movements of the front end of the frame 9, but limit such movements.

The disintegrating rollers, hereinafter described, are arranged to be driven, as shown, by an internal combustion engine 14 suitably mounted on the top of the frame 9 and provided with a crank shaft 15, one projecting end of which is equipped with a driving sprocket 16.

The furrow which may be dirt with the quack grass growing therein, or a layer of dirt and sod, will be delivered off from the upper edge of the mold board 5 onto the front or receiving member 17 of the series of disintegrating rollers. This disintegrating roller 17 has projecting teeth 18 and its shaft 19 is extended through and journaled in the pivoted sleeves 8 and, at one projecting end, is equipped with a sprocket 20. Just at the rear of the roller 17 and receiving therefrom, is a second and larger disintegrating roller 21 equipped with teeth 22 and having a shaft 23 journaled in suitable bearings on the under side portions of the frame 9. The roller shaft 23 at one end, is equipped with a sprocket 24 and at its other end with a sprocket 25.

The engine is removed from the frame 9 in Fig. 1, but is shown in Figs. 2 and 3.

Just at the rear of the roller 21 and receiving therefrom is a third disintegrating roller 26 equipped with teeth 27 and having a shaft 28 that is journaled in suitable bearings on the under side portions of the frame 9 and is provided at one end with a sprocket 29 and, at its other end, with a sprocket 30.

Just at the rear of the third roller 26 is a fourth disintegrating roller 31 provided with teeth 32 and having a shaft 33 also journaled in suitable bearings on the under side portions of the frame 9 and provided at its ends with sprockets 34 and 35.

Just at the rear of the fourth roller 31 and receiving therefrom is a fifth disintegrating roller 36 provided with teeth 37 and having a shaft 38 also journaled in suitable bearings in the under side portions of the frame 9 and provided at its projecting ends with sprockets 39 and 40.

Mounted just at the rear of the fifth roller 36 and receiving therefrom is a large roller or drum 41 shown as made up of heads and slats, and provided with teeth 42. This roller or drum 41 has a shaft 43 journaled in suitable bearings on the under side portions of the frame 9 and provided at its ends with sprockets 44 and 45.

A sprocket chain 46 runs over the alined sprockets 20 and 24 of the roller shafts 19 and 23, respectively; a sprocket chain 47 runs over the alined sprockets 25 and 30 of the shafts 23 and 28 respectively; a sprocket chain 48 runs over the alined sprockets 29 and 34 of the shafts 28 and 33, respectively; a sprocket chain 49 runs over the alined sprockets 35 and 40 of the shafts 33 and 38, respectively; a sprocket chain 50 runs over the alined sprockets 39 and 44 of the roller shafts 38 and 43, respectively; and a sprocket chain 51 runs over the sprocket 45 of roller shaft 43 and over the driving sprocket 16 of the engine crank shaft 15.

With the driving connections described, all of the disintegrating rollers will be driven in a common direction, to wit, in an anti-clockwise direction, in respect to Fig. 3, and under such direction of rotation, the uplifted furrow will be delivered, as stated, first onto the first or lower disintegrating roller 17 and will be carried progressively over the rollers 21, 26, 31, 36 and 41, being all the time subjected to the action of the disintegrating teeth of the said rollers.

Moreover, the driving connections, as is obvious from inspection of the drawings, are such that the said rollers, in the order named, will be given progressively greater and greater peripheral speed, so that the dirt and commingled quack grass or the sod, as the case may be, will be progressively jerked from the one roller to the other and subjected to teeth moving at higher and higher velocity. This has the effect of thoroughly tearing up the mass of commingled earth and quack grass or sod, so that when discharged at the rear of the machine, the quack grass in the one instance, will be turned up and thoroughly shaken loose from the dirt, while in the other instance, the sod will be turned into small fragments and freed from dirt.

With only the rollers as described, there would, however, be a tendency to throw the earth and sod rearward too rapidly, so that in many instances complete disintegration or tearing up would not be produced. To obviate this, we provide over the series of rollers a so-called retarding rack which may take various forms but particularly, is constructed as shown in the drawings and which described, is as follows:

The retarding rack, as illustrated, is made up of a plurality of metal angle bars 52 tied together by cross cleats 53. The depending flanges of the bars 52 are notched or made saw-toothed. Hanger rods 54 are passed through the front and rear portions of the depending flanges of the bars 52, and the ends of these rods are positioned between laterally spaced flanges 55 secured to the sides of the frame 9 in approximately upright positions. Stops afforded by short nut-equipped bolts 56 are passed through any of a series of perforations 57 in the flanges 55, and the ends of the hanger rods 54 rest upon these bolts. In this way, the retarding rack may be supported in different vertical adjustments with its teeth a predetermined distance from the toothed disintegrating drums but with the rack free to move vertically whenever it is crowded upward by accumulated material. This rack 52, as shown, overlies all of the disintegrating rollers except the rearmost and largest disintegrating roller 41. Overlying this rear roller 41 is a supplemental retarding rack 58 having depending saw teeth or notches.

This rear retarding rack 58 is also preferably made vertically adjustable, as follows:

The front end thereof is pivoted at its front end on a transverse rod 59 that is adapted to be passed through any one of several vertically spaced holes 60 in the sides of the frame 9, and at its rear end, is adapted to rest loosely on a stop pin 61 that is adapted to be inserted in any one of a series of holes 62 formed in one of the upright rear end bars of the frame 9. Thus the rear or supplemental retarding rack is made both vertically adjustable and vertically yielding at its rear portion.

When the machine is in action, the earth and grass will be thrown violently upward and rearward by the disintegrating rollers, and, striking against the teeth or serrations of the retarding racks, will be stopped in their rearward movements and caused to be reëngaged over and over again with the successive disintegrating drums. This insures complete separation of the grass from the earth. Under overaccumulation of earth and grass between the teeth, rollers and the retarding racks 52, and 58, said racks will freely rise and prevent clogging.

Some conditions of the soil require means to assist in forcing of the uplifted earth from the mold board 5 onto the front roller 17, and hence I provide an overhead or raised tooth-equipped so-called delivery roller 63 which is located the proper distance above the rear upper edge of said mold board. The shaft 64 of this roller 63 is journaled in suitable bearings on the front end portion of the frame 9 and is provided at one end with a spur gear 65 that meshes with a spur gear 66 on a short shaft 67 journaled in a suitable bearing on the front portion of the frame 9 and I provide also a grooved pulley 68. A belt 69 runs over this pulley 68 and over a similar pulley 70 which, as shown, is secured on the hub of the engine driven sprocket 45.

By the connections just described, the toothed delivery roller 63 will be rotated in a clockwise direction in respect to Fig. 3, so that it will throw the uplifted sod, grass and dirt onto the first roller 17. This so-called delivery roller also greatly assists in the disintegrating action.

Here it should also be noted that the toothed rollers described are arranged to run in quite close contact and that the teeth thereof are in staggered arrangement so that the teeth of one roller will not engage with the teeth of an adjacent roller.

The machine, while simple, both in construction and operation, and of comparatively small cost, has solved the problem of digging up and disintegrating sod and of digging up, tearing to pieces and separating quack grass from the earth, so that its eradication from the soil may be effected in an economical manner.

The rate or manner of progression for giving the peripheral speed to the disintegrating rollers may, as stated, be varied, but in the machine that I have designed, the six rollers from front to rear have been designed to run approximately at the following number of rotations per minute, to wit, 150, 150, 200, 300, 400, 400. In this arrangement, the decreased peripheral speed between the first and second rollers is due to the difference in diameters of the said rollers and the difference in peripheral speed between the last and next to last rollers is also due to the difference in the size of said rollers.

In raising and lowering the plow to and from operative position in the ground, there is a pivotal motion of the frame on the main axle and a pivotal movement on the connection between the sleeve 8 and arms 7 of the plow. This movement is made an easy matter by the balance of the machine. The ends and other parts are so located that there is a slight excess of weight on the rear portion of the frame 9, to wit, enough to raise the front end, if disconnected from the plow, but not enough to lift the plow from the ground. The driver and operator of the plow, by manipulation of the ordinary lifting lever, will, however, find it an easy matter, either to raise the plow or lower the same, carrying with it the front end of the frame 9.

What we claim is:

1. In a machine of the kind described, the combination with means for uplifting a furrow, of a series of toothed disintegrating rollers receiving the uplifted furrow, means for driving said rollers in a direction to carry the furrow over the tops of said rollers in performing the disintegrating action, and a retarding rack mounted above said rollers and held against movement in the direction of the travel of the material over said rollers.

2. In a machine of the kind described, the combination with means for uplifting a furrow, of a series of toothed disintegrating rollers receiving the uplifted furrow, means for driving said rollers in a direction to carry the furrow over the tops of said rollers in performing the disintegrating action, and a retarding rack mounted above said rollers, the said rack being limited in its downward movement but free for upward movements under upward pressure and held against movement in the direction of travel of the material over said rollers.

3. In a machine of the kind described, the combination with means for uplifting a furrow, of a series of toothed disintegrating rollers receiving the uplifted furrow, means for driving said rollers in a direction to carry the furrow over the tops of said rollers in performing the disintegrating action, and a retarding rack having depending tooth flanges spaced from but mounted above said rollers, the said rack being limited in its downward movement but free for upward movements under upward pressure.

4. In a machine of the kind described, the combination with means for uplifting a furrow, of a series of toothed disintegrating rollers receiving the uplifted furrow, means for driving said rollers in a direction to carry the furrow over the tops of said rollers in performing the disintegrating action, and a retarding rack mounted above said rollers, the said rack being limited in its downward movement but free for upward movements under upward pressure, and means for thus supporting said retarding rack in different vertical normal adjustments in respect to the underlying disintegrating rollers.

5. In a machine of the kind described, the combination with means for uplifting a furrow, of a series of toothed disintegrating rollers receiving the uplifted furrow, and front and rear retarding racks yieldingly adjustable and independently mounted above said disintegrating rollers.

In testimony whereof we affix our signatures in presence of two witnesses.

AXEL NEWDALL.
NELS P. NELSON.
MAGNUS NEWDALL.

Witnesses:
BERNICE G. BAUMANN,
HARRY D. KILGORE.